United States Patent [19]

Shields

[11] Patent Number: 5,088,562
[45] Date of Patent: Feb. 18, 1992

[54] HAND AERATOR

[76] Inventor: Robert L. Shields, P.O. Box 164, Miltona, Minn. 56354

[21] Appl. No.: 621,338

[22] Filed: Dec. 3, 1990

[51] Int. Cl.⁵ .......................................... A01B 45/02
[52] U.S. Cl. .................................. 172/22; 294/50.7; 73/864.45
[58] Field of Search ............................ 172/21, 22, 19; 294/50.7; 73/864.44, 864.45; 175/313

[56] References Cited

U.S. PATENT DOCUMENTS

| | | | |
|---|---|---|---|
| 971,791 | 10/1910 | Prisk | 172/22 |
| 3,163,456 | 12/1964 | Schell, Jr. et al. | 172/22 X |
| 3,817,337 | 6/1974 | Panak et al. | 172/22 X |
| 4,585,072 | 4/1986 | Martinez | 172/22 |
| 4,763,735 | 8/1988 | Gay | 172/22 X |
| 4,947,938 | 8/1990 | Fricke et al. | 172/22 |
| 4,958,688 | 9/1990 | Marrow et al. | 172/22 |

FOREIGN PATENT DOCUMENTS 856537 12/1960 United Kingdom .................. 172/22

OTHER PUBLICATIONS

Lewis Standard Tools Publication.
A. M. Leonard, Inc. Publication, p. 29.

Primary Examiner—Randolph A. Reese
Assistant Examiner—Jeffrey L. Thompson
Attorney, Agent, or Firm—Burd, Bartz & Gutenkauf

[57] ABSTRACT

A hand operated aerator for cutting a plurality of holes in turf and soil to facilitate incoporation of air, water, and plant nutrients into the soil and has an upright member attached to a pan. A plurality of tubes attached to the pan are pushed into the turf and soil to cut holes therein. A foot located below the pan is operatively connected to a lever mechanism that is manually moved to extract the tubes from the turf and soil.

23 Claims, 2 Drawing Sheets

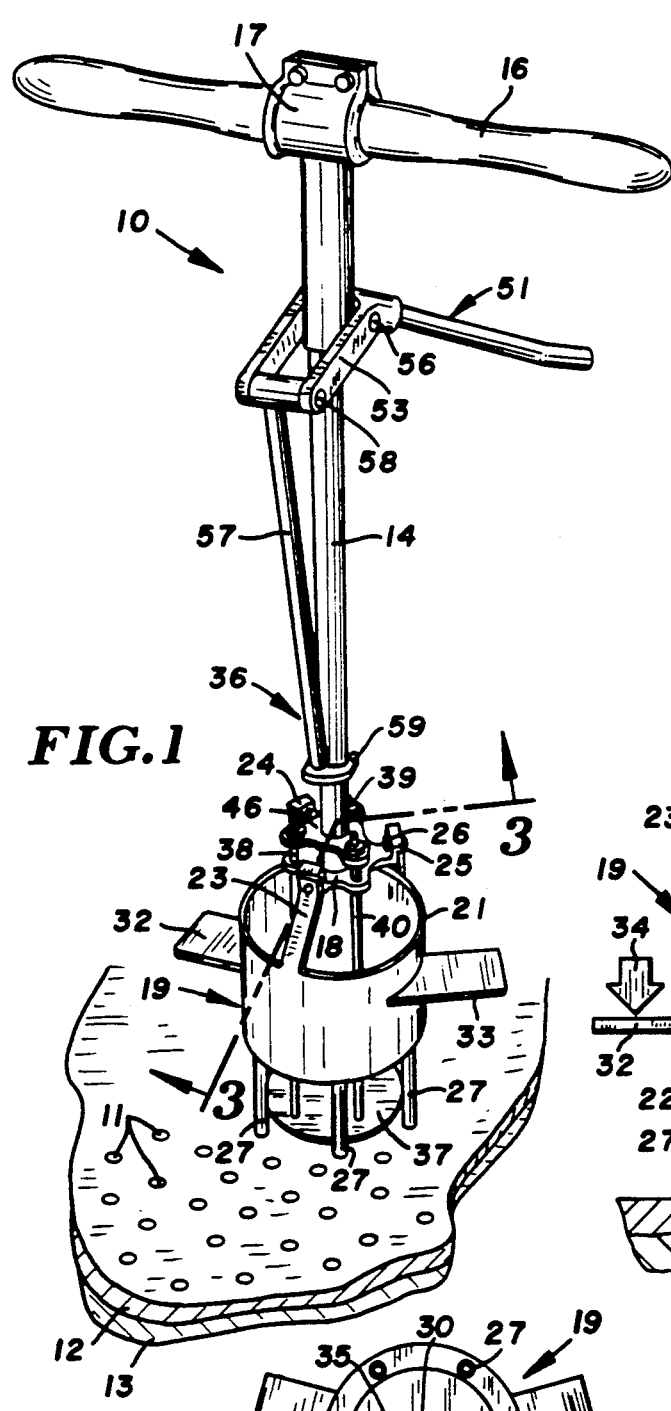
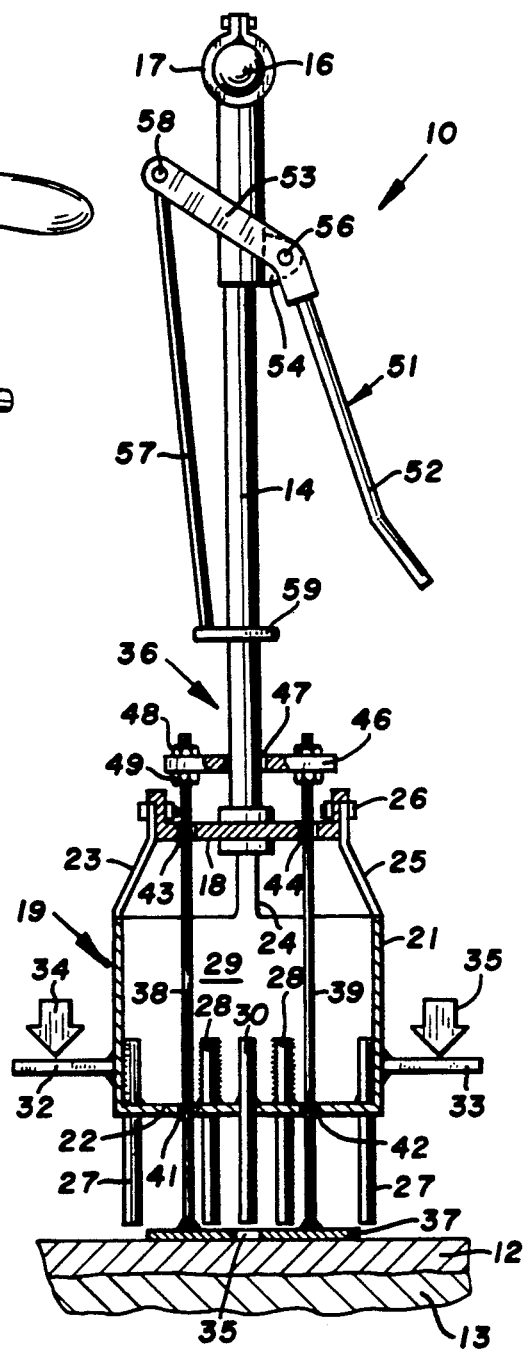
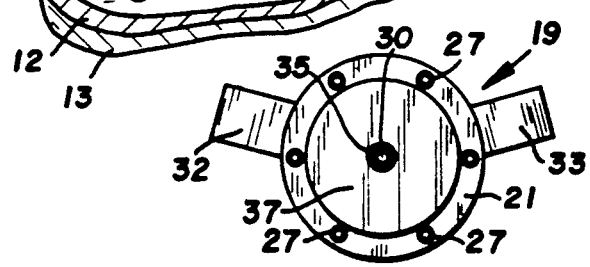
FIG.1
FIG.2
FIG.3

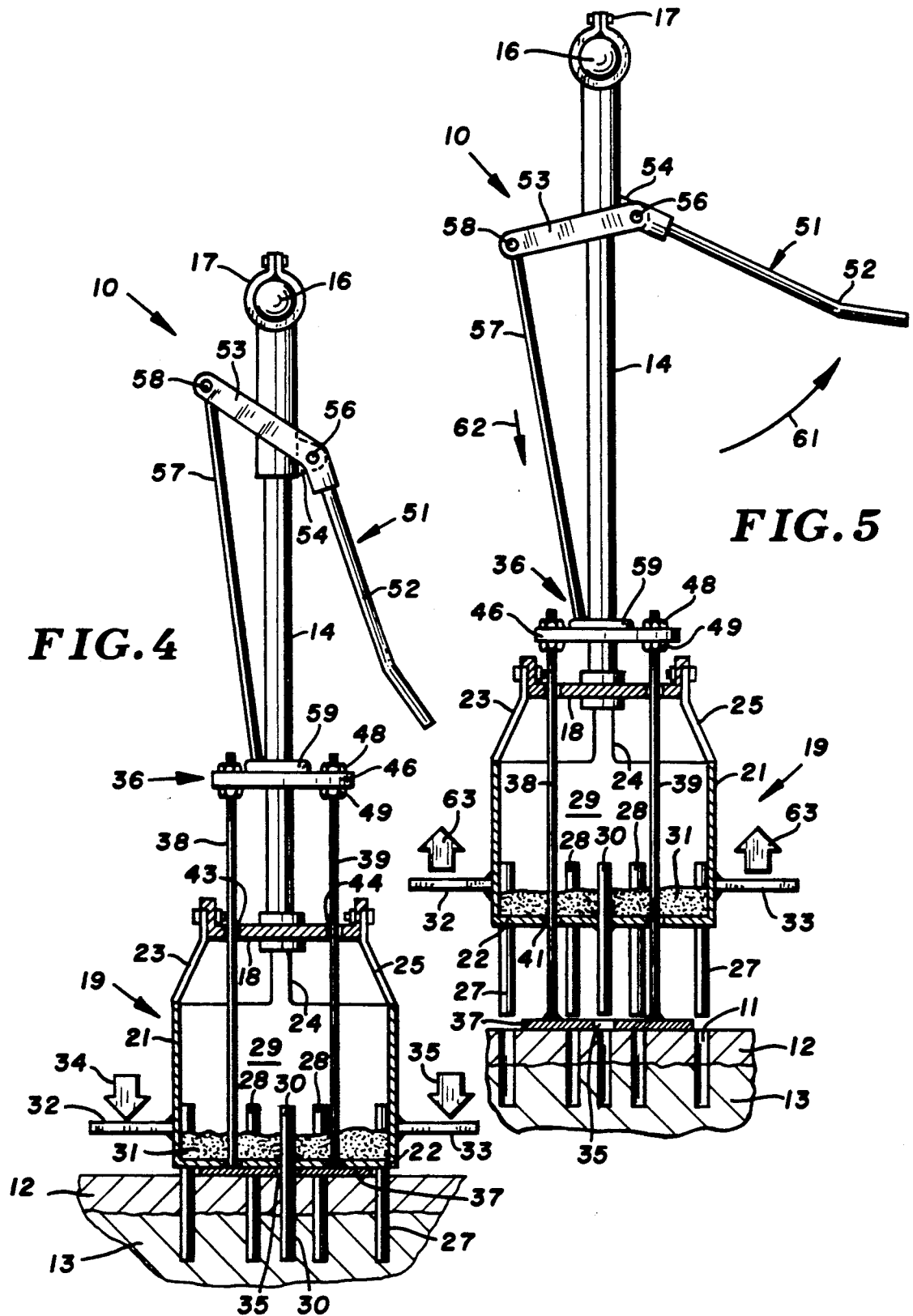

HAND AERATOR

TECHNICAL FIELD

The invention is in the field of hand tools for making a plurality of holes in sod and turf to fascilitate the incorporation of air, water, and plant nutrients into the soil.

BACKGROUND OF THE INVENTION

Hand tools having a plurality of spikes or pronges have been used to punch holes into sod, golf course turf, and lawns to aerate the soil. These tools have an elongated handle secured to transverse foot pressure members. A plurality of fingers or spikes are secured to the transverse members. These tools are used by applying downward pressure on the transverse member to force the spikes into the ground. The spikes are solid elongated members that compress the soil as they are forced downwardly into the soil and thereby restrict flow of air into the soil. Aerators are used to aerify small turf areas around dry spots, ends of golf cart paths and between greens and bunkers, around sprinkler heads and on the top of mounds or in like areas where there are signs of compaction or dry spots. Aeration is used to loosen the soil so that air, water and nutrients can flow into the soil and encourage turf root development.

SUMMARY OF THE INVENTION

The invention is directed to a hand apparatus for making a plurality of holes in soil and turf to facilitate the aeration and penetration of water and plant nutrients into the soil. The apparatus has a member supporting a plurality of upright tubes that are adapted to be forced into the ground to form separate holes in the soil. The tubes are extracted from the ground with a foot engaging the ground and operatively connected to a hand operated device.

A preferred embodiment of the apparatus for making a plurality of holes in the turf and soil; herein called a hand aerator, has a generally upright member or post having an upper end and a lower end. A transverse handle is secured to the upper end of the member. A cup-shaped pan is attached to the lower end of the member. A plurality of tubes secured to the pan extend circumferentially around the pan. A central tube is secured to the bottom wall of the pan. All of the tubes project downwardly from the bottom of the pan. Each of the tubes has a top opening located within the pan so that soil and turf moving through the tubes are placed within the pan. The pan has an open top to fascilitate the removal of the soil and turf from the pan. A generally flat plate or foot is located below the bottom of the pan. The central tube projects through hole in the foot. Upright rods extended through guide holes in the bottom of the pan and a transverse base secured to the bottom of the upright member. The central tube and rods guide the foot for movement along the longitudinal axis of the aerator. The upper ends of the rods are located on a carrier that is slideably mounted on the upright member. The foot is moved relative to the pan with a lever to extract the tubes out of the turf and soil. The lever has an arm pivotally connected to the upright member. A rod extends downwardly from an end of the arm to a generally U-shaped yoke surrounding a portion of the upright member. When the lever is moved in an upward direction the yoke slides down along the member and engages the carrier thereby forcing the foot down and pan and tubes up. When the foot engages the soil and the tubes are located in the turf and soil the upward movement of the lever will extract the tubes from the soil and turf. When the lever is moved to its down position the tubes can be foot forced into the turf and soil to make a second group of holes in the turf and soil. The process is repeated until the desired number of holes are placed in the turf and soil.

DESCRIPTION OF THE DRAWINGS

FIG. 1 is a perspective view of the hand aerator of the invention showing holes that have been placed in the turf and soil;

FIG. 2 is a bottom plan view of the aerator;

FIG. 3 is a side elevational view partly sectioned of the aerator with the tubes located above the turf;

FIG. 4 is a sectional view similar to FIG. 3 showing the tubes being located within the soil; and FIG. 5 is a sectional view similar to FIG. 3 showing the lever moved in an up position to extract the tubes from the turf and soil.

DESCRIPTION OF PREFERRED EMBODIMENT

Referring to FIG. 1 there is shown the hand aerator of or turf 12. The aerator 10 is used to make a plurality of holes 11 in the turf 12 which extend down into soil 13. The holes 11 facilitate the incorporation of air and water in the soil along with plant nutrients.

Aerator 10 has an upright member or post 14 having an upper end secured to a transverse handle 16 with a clamp connector 17. The lower end of post 14 is secured to a transverse or flat base 18. A pan indicated generally at 19 for accommodating soil and turf is located below base 18. Pan 19 has an upright cylindrical side wall 21 joined to a horizontal bottom wall 22. The top portion of side wall 21 is joined to three upwardly directed arms 23, 24 and 25 which are secured with bolts 26 to separate portions of base 18. As shown in FIGS. 1, 2, and 3, a plurality of downwardly directed tubes 17 are secured to the side wall 21 and bottom wall 22 by welds or the like. Tubes 27 project downwardly through holes in the bottom wall 22. A central tube 30 is secured by welds or the like to the center of bottom wall 22. All of the tubes 17 and 30 can be secured to bottom wall 22 by welds or the like. The upper ends 28 of tubes 17 and 30 are open so that when tubes 17 and 30 are forced into the turf and soil cylindrical portions of turf and soil move through tubes 17 and 30 and are deposited in pan 19 as shown at 31 in FIGS. 4 and 5.

A pair of outwardly directed ears or steps 32 and 33 are secured to opposite portions of the side wall 21. Ears 32 and 33 are used to accommodate an operator's foot to apply downwardly directed force indicated by the arrows 34 and 35 to move the tubes 27 and 30 into the turf and soil as shown in FIG. 4. The tubes 27 and 30 having upright passages cut into the soil with a minimum of compression or compaction of the soil adjacent the holes.

The tubes 27 and 30 are moved upwardly from the soil and turf with a hand operated extractor indicated generally at 36. Extractor 36 has a generally circular foot, plate, or disc 37 located below the bottom wall 22 of pan 19. Foot 37 has a center hole 35 to allow the central tube 30 to project through the foot and into the turf and soil. Foot 37 is located at a generally horizontal position and is attached to three upright rods 38, 39 and 40. The rods 38-40 extend through holes 41 and 42 in bottom wall 22 and holes 43 and 44 in the base 18. The bottom wall 22 and base 18 has holes for the rod 40. The rods 38-40 guided by holes 41, 42, 43 and 44 and center tube 30 limit the movement of foot 37 in up and down directions to raise and lower foot 37. The foot 37 moves relative to pan 19 along the longitudinal axis of aerator 10. The upper ends of rod 38, 39 and 40 are secured to a generally horizontal plate 46 slideably mounted on the lower portion of post 14. Plate 46 has a center hole 47 that accommodates post 14. Pairs of nuts 48 and 49 secure the upper ends of rods 38, 39 and 40 to circumferentially spaced portions of plate 46 as seen in FIG. 1.

A hand operated lever indicated generally at 51 functions to move foot 37 in a downward direction to extract tubes 27 and 30 from the soil and turf. Lever 51 comprises a downwardly directed arm 52 connected at its upper end to yoke 53. Yoke 53 straddles the upper end of post 14 and is pivotally mounted on a lateral ear 54 secured to post 14 with a pivot pin 56. The outer end of yoke 53 is pivotally connected to a downwardly directed compression rod 57 with a pivot pin 58. The lower end of rod 57 is secured to a C-shaped collar 59 that straddles the lower portion of post 14.

In use as shown in FIG. 3 aerator 10 is placed in an upright position on top of turf 12. The foot 37 rests on top of turf 12. Tubes 27 and 30 are located above turf 12. When downwardly directed force, indicated by arrows 34 and 35, is applied to steps 32 and 33 tubes 27 and 30 are moved through turf 12 into the soil, as shown in FIG. 4, thereby cutting a plurality of holes in the turf an soil. Foot 37 moves upwardly relative to tubes 27 and 30 and into engagement with bottom wall 22 of pan 19. Plate 46 moves upwardly into engagement with collar 59 as seen in FIG. 4.

Tubes 27 and 30 are extracted from the turf and soil by moving the lever arm 52 in an upward direction as indicated by the arrow 61 in FIG. 5. This applies a downwardly directed force on compression rod 57 as indicated by arrow 62. Continued upward movement of the lever arm 52 will cause pan 19 and tubes 27 and 30 attached thereto to move in an upward direction as indicated by arrow 63 out of the soil 13 and turf 12. The foot 37 being a flat plate rests on top of the turf 12 and provides a support for extractor 36 to allow quick and linear upright movement of tubes 27 and 30 thereby leaving holes 11 in the turf 12 and soil 13.

While there has been shown and described a preferred embodiment of the aerator of the invention it is understood that changes in the structure, arrangement of structure and parts may be made by those skilled in the art without departing from the invention. The invention is defined in the following claims.

I claim:

1. An apparatus for making holes in turf and soil comprising: an upright member having an upper end and a lower end, a transverse handle secured to the upper end of the member, a cup-shaped pan secured to the lower end of the member, a plurality of tubes secured to the pan extended downwardly from the bottom of the pan, each of the tubes having open upper ends located within said pan whereby soil and turf moving through said tubes is retained within said pan, a foot located below said pan, means movably mounting the foot on the upright member for movement relative to said pan, and lever means mounted on the upright member operable to move the means movably mounting the foot on the upright member thereby moving said foot whereby when the tubes are in the soil the lever means can be moved to push the foot onto the turf and extract the tubes from the soil and turf.

2. The apparatus of claim 1 wherein: the upright member is a cylindrical member having said upper end, and connector means securing the handle to the upper end of the cylindrical member.

3. The apparatus of claim 1 wherein: said pan has an upright side wall and a bottom wall, said tubes being secured to said bottom wall.

4. The apparatus of claim 3 wherein: the bottom wall is secured to the side wall and said tubes extended through holes in the bottom wall.

5. The apparatus of claim 1 wherein: said pan has an upright cylindrical side wall, said tubes being circumferentially spaced around the side wall.

6. The apparatus of claim 5 including: a central tube secured to a central portion of the bottom wall, said foot having a hole aligned with the central tube, said central tube extended through said hole when the tubes have been inserted into the turf and soil.

7. The apparatus of claim 1 wherein: the means movably mounting the foot on the upright member comprises a plurality of rods extended through holes in the bottom wall and a plate movably mounted on the upright member, said rods being secured to said plate.

8. The apparatus of claim 7 including: a base secured to the lower end of the upright member below the plate, said base having holes accommodating said rods to guide said rods.

9. The apparatus of claim 7 wherein: the lever means includes an arm, pivot means mounting the arm on the upright member, rod means connected to the arm, and yoke means slidably mounted on the upright member connected to the rod means, said yoke means being engagable with said plate when the arm is pivoted upward to thereby move the pan away from the foot to extract the tubes from the turf and soil.

10. An apparatus for making holes in turf and soil comprising: an upright member having an upper end and a lower end, a handle secured to the upper end of the member, a pan secured to the lower end of the member, at least one tube secured to the pan extended downwardly from the pan, said tube having an open upper end located within said pan whereby soil and turf moving through said tube is retained within said pan, a foot located below said pan, means movably mounting the foot on the upright member for movement relative to said pan, and means mounted on the upright member operable to move the means movably mounting the foot on the upright member thereby moving said foot whereby when the tube is in the soil the means mounted on the upright member can be moved to push the foot onto the turf and extract the tube from the soil and turf thereby making a hole in the turf and soil.

11. The apparatus of claim 10 wherein: the upright member is a cylindrical member having said upper end, and connector means securing the handle to the upper end of the cylindrical member.

12. The apparatus of claim 10 wherein: said pan has an upright side wall and a bottom wall, said tube being secured to said bottom wall.

13. The apparatus of claim 12 wherein: the bottom wall is secured to the side wall and said tube extends through a hole in the bottom wall.

14. The apparatus of claim 10 wherein: said pan has an upright cylindrical side wall, and a plurality of tubes being circumferentially spaced around the side wall.

15. The apparatus of claim 14 including: at least one central tube secured to a central portion of the bottom wall, said foot having a hole for accommodating each central tube whereby each central tube projects through a hole in said foot when the tubes have been inserted into the turf and soil.

16. The apparatus of claim 10 wherein: the means movably mounting the foot on the upright member comprises a plurality of rods extended through holes in the bottom wall and a plate movably mounted on the upright member, said rods being secured to said plate.

17. The apparatus of claim 16 including: a base secured to the lower end of the upright member below the plate, said base having holes accommodating said rods to guide said rods.

18. The apparatus of claim 17 wherein: the lever means includes an arm, pivot means mounting the arm on the upright member, rod means connected to the arm, and yoke means slidably mounted on the upright member connected to the rod means, said yoke means being engagable with said plate when the arm is pivoted upward to thereby move the pan away from the foot to extract the tubes from the turf and soil.

19. An apparatus for making holes in soil comprising: a first member having an upper end and a lower end, a second member secured to the lower end of the first member, first means including a plurality of tubular members secured to the second member and extended downwardly from the second member for making holes in the soil, said tubular members having open upper and lower ends whereby soil moves through the tubular members when they are inserted into the soil, a foot located below said second member, second means movably mounting the foot on the first member for movement relative to said second member, and third means mounted on the first member operable to move the second means movably mounting the foot on the first member thereby moving said foot whereby when the first mean sis in the soil the second means mounted on the first member can be moved to push the foot onto the soil and extract the tubular members from the soil thereby making holes in the soil.

20. The apparatus of claim 19 wherein: the second means movably mounting the foot on the first member comprises a plurality of rods extended through holes in the second member and a plate movably mounted on the first member, said rods being secured to said plate.

21. The apparatus of claim 20 including: a base secured to the lower end of the first member below the plate, said base having holes accommodating said rods to guide said rods.

22. The apparatus of claim 21 wherein: the third means includes an arm, pivot means mounting the arm on the first member, rod means connected to the arm, and yoke means slidably mounted on the first member connected to the rod means, said yoke means being engagable with said plate when the arm is pivoted upward to thereby move the second member away from the foot to extract the tubular means from the soil.

23. The apparatus of claim 19 wherein: the second member is a pan-shaped member, said tubular members having upper ends located above the pan-shaped member whereby soil from the tubular members is deposited on the pan-shaped member when the tubular members are inserted into the soil.

* * * * *